United States Patent [19]

Kelsey

[11] Patent Number: 5,276,119

[45] Date of Patent: Jan. 4, 1994

[54] TRANSITION METAL HYDRIDES AS CO-CATALYSTS FOR OLEFIN POLYMERIZATION

[75] Inventor: Donald R. Kelsey, Fulshear, Tex.

[73] Assignee: Shell Oil Company, Houston, Tex.

[21] Appl. No.: 997,802

[22] Filed: Dec. 29, 1992

[51] Int. Cl.$^5$ .................. C08F 4/76; C08G 61/08
[52] U.S. Cl. .................. 526/170; 526/113; 526/118; 526/281; 526/283; 502/102; 502/152; 502/154
[58] Field of Search .............. 526/113, 118, 170, 283, 526/281; 502/102, 152, 154

[56] References Cited

U.S. PATENT DOCUMENTS

| | | | |
|---|---|---|---|
| 4,011,386 | 3/1977 | Matsumoto et al. | 526/113 X |
| 4,426,502 | 1/1984 | Minchak | 526/172 |
| 4,729,976 | 3/1988 | Sjardijn et al. | 502/102 |
| 4,810,762 | 3/1989 | Sjardijn et al. | 526/166 |
| 4,918,039 | 4/1990 | Martin | 526/114 X |
| 4,935,394 | 6/1990 | Chang | 502/104 |
| 5,028,672 | 7/1991 | Sjardijn et al. | 526/128 |
| 5,071,812 | 12/1991 | Kelsey | 502/164 |
| 5,082,817 | 1/1992 | Albizzati et al. | 526/113 X |
| 5,093,441 | 3/1992 | Sjardijn et al. | 526/126 |
| 5,095,082 | 3/1992 | Kelsey | 526/282 |
| 5,143,992 | 9/1992 | Kelsey | 526/283 |

FOREIGN PATENT DOCUMENTS

| | | | |
|---|---|---|---|
| 2503943 | 8/1975 | Fed. Rep. of Germany | 526/113 |
| 2-206606 | 8/1990 | Japan | 526/118 |

Primary Examiner—Fred Teskin

[57] ABSTRACT

An improved olefin metathesis catalyst system is disclosed. The catalyst system comprises a transition metal halide metathesis catalyst and an organo transition metal hydride co-catalyst of the formula $$L_x-M-H$$

wherein M is a group IVB transition metal including zirconium, titanium or hafnium; L is a ligand selected independently from the group of hydrogen, halide and organic ligands such as an optionally substituted $C_{1-20}$ alkyl or alkenyl, an optionally substituted $C_{3-20}$ cycloalkyl or cycloalkenyl having 3 to 6 carbon atoms in the ring, an optionally substituted $C_{5-20}$ cycloakadienyl having 5 carbon atoms in the cycloalkadienyl ring, or an optionally substituted $C_{6-20}$ aryl or fused aryl, where at least one L is a cycloalkadienyl; and x is one less than the valence of M. The optional substitutions on the organic ligands include halogens, preferably chloride or flouride; $C_{1-6}$ alkyl; $C_{1-6}$ alkoxy; and $C_{1-6}$ haloalkyl. The preferred ligand is a $C_{5-20}$ cycloalkadienyl having 5 carbon atoms in the cycloalkadienyl group, e.g. cyclopentadienyl. The co-catalysts of this invention are combined with molybdenum or tungsten metathesis catalysts to provide an active catalytic system for the polymerization of cycloolefins, such as dicyclopentadiene.

21 Claims, No Drawings

TRANSITION METAL HYDRIDES AS CO-CATALYSTS FOR OLEFIN POLYMERIZATION

BACKGROUND OF THE INVENTION

1. Field of the Invention

The present invention relates to an improved catalyst system for the ring-opening or metathesis polymerization of cyclic olefins, such as dicyclopentadiene. More specifically, this invention relates to an improved co-catalyst for methathesis polymerization.

2. Description of Related Art

Cyclic olefins are subjected to ring-opening metathesis polymerization to produce thermoplastic or thermoset polymers having physical properties which make them suitable for structural and electronic applications, such as molded plastic items and electrical laminates. Such polymerizations are commonly carried out in reaction injection molding (RIM) processes, in which a metathesis catalyst and a monomer are charged to a heated mold, and polymerization of the monomer and forming of the polymer into the desired shape are carried out simultaneously in the mold.

In such RIM processes, it is important that the polymerization reaction occur rapidly and with as complete incorporation of the charged monomers as possible. For example, the presence of unreacted monomers in molded polydicyclopentadiene may result in a molded part with an unpleasant odor, and less than optimum physical properties. Finding a RIM process that reacts in as short a cycle time as possible and at mold temperatures at or near room temperature is economically desirable. It is also advantageous to be able to use a less than pure monomer stream and thus avoid extensive purification of the monomer prior to polymerization.

For most cyclic olefin metathesis catalyst systems, the presence of reactive materials such as water and oxygen should be avoided because they foul the polymerization reaction. Small amounts of reactive material may be acceptable, but water in excess of 20 parts per million (ppm) should generally be avoided. As a result, it is usually necessary to thoroughly dry the cycloolefin monomers prior to contact with the polymerization catalyst, and to conduct the polymerization in an inert environment.

Numerous patents and literature references describe techniques for polymerization of cycloolefins in the presence of a variety of olefin metathesis catalysts. Among the more effective ring-opening polymerization catalysts are homogenous catalyst systems based on tungsten or molybdenum halides, often employed with an organotin or organoaluminum co-catalyst. Examples of such catalyst systems are disclosed by Sjardijn et al., U.S. Pat. Nos. 4,810,762 and 5,093,441, wherein phenolic tungsten halides are used with organotin hydrides. Similar catalyst systems are disclosed by Sjardijn et al. in U.S. Pat. No. 4,729,976, which have been found to be highly active in a relatively impure dicyclopentadiene feed stream.

The use of aluminum or tin based co-catalysts, however, has certain drawbacks. Both co-catalysts require special handling because of toxicity concerns and sensitivity to air and moisture. Tin co-catalysts can also be quite expensive. Therefore, a co-catalyst for use with tungsten or molybdenum based catalysts other than tin or aluminum is desirable.

SUMMARY OF THE INVENTION

The present invention provides an improved olefin metathesis catalyst system for the ring-opening polymerization of cycloolefins, such as dicyclopentadiene. Also disclosed herein is a novel polymerization mixture containing the catalyst system and cycloolefin, and the ring-opening polymerization process which employs such a catalyst system. More particularly, the invention provides a organo transition metal-based hydride co-catalyst for use in combination with transition metal halide metathesis catalysts. The organo transition metal hydride co-catalyst of this invention has the general formula $L_xMH$ wehrein M is a transition metal selected from group IVB, titanium, zirconium and hafnium; L is a ligand selected independently from the group of hydrogen, halides and organic ligands such as an optionally substituted $C_{1-20}$ alkyl or alkenyl, an optionally substituted $C_{3-20}$ cycloalkyl or cyloalkenyl having 3 to 6 carbon atoms in the ring, an optionally substituted $C_5-C_{20}$ cycloalkadienyl having 5 carbon atoms in the cycloalkadienyl ring, or an optionally substituted $C_{6-20}$ aryl or fused aryl, where at least one L is a cycloalkadienyl; and x is one less than the valence of M. The optional substitutions on the organic ligands include halogens, preferably chloride or fluoride; $C_{1-6}$ alkyl; $C_{1-6}$ alkoxy; and $C_{1-6}$ haloalkyl.

DETAILED DESCRIPTION OF THE INVENTION

The Catalyst

The polymerization catalyst used herein is selected from ring opening metathesis catalysts that include a transition metal compound. Ring opening metathesis catalysts are those catalysts which facilitate the breaking of the monomer ring at double bonds to form linear or crosslinked polymers containing unsaturation. The transition metal is preferably, because of the high activity of the resulting catalyst for polymerization of polycycloolefin, e.g. dicyclopentadiene, a metal of Group VB or VIB such as molybdenum, tungsten or tantalum.

The transitional metal metathesis catalyst compounds comprising the catalyst system of the present invention have been disclosed previously in the patent literature, see, e.g., Kelsey et al., U.S. Pat. No. 5,071,812 (transition metal halide reaction products of alcohols and phenols); Sjardijn et al., U.S. Pat. Nos. 5,093,441, 5,028,672, 4,810,762 and 4,729,976 (reaction product of tungsten halide and phenol); U.S. Pat. No. 4,020,254 (tungsten halide and tungsten oxyhalides); U.S. Pat. No. 4,426,502 (ammonium molybdate and tungstate catalysts) just to name a few of the many varied examples of transition metal metathesis catalysts.

The transition metal metathesis catalyst (or starting material therefor) is generally in the form of a salt, including such salts as halides, including oxyhalides. Suitable halides include chloride, bromide and fluoride. The transition metal halide is preferably one in which the halide is present in a molar amount of at least three atoms per atom of transition metal. Examples of such transition metal halides include molybdenum pentachloride, molybdenum pentabromide, molybdenum oxytetrachloride, molybdenum oxytrichloride, molybdenum trioxyhexachloride, molybdenum trioxypentachloride, molybdenum oxytetrafluoride, tungsten hexachloride, tungsten oxytetrachloride, and tungsten oxytetrabromide. Some preferred transition metal catalysts, because of their high activity for dicyclopentadiene polymerization, are tungsten hexachloride, tungsten oxytetrachloride, molybdenum oxytrichloride, mixtures thereof, and derivatives thereof.

The transition metal metathesis catalyst will generally be present in the polymerization reaction mixture in an amount of from about 0.001 to about 0.5, preferably from about 0.002 to about 0.2, most preferably from about 0.01 to about 0.1 mole percent, based on moles of cyclic olefin monomer present.

The transition metal metathesis catalyst preferably includes the reaction product of the above transition metal salt with an alcohol, phenol, or biphenol. The incorporation of an organic ligand generally enhances solubilization of the transition metal salt catalyst in the monomer stream and enhances its catalytic activity.

The solubilizing organic ligand can be, for example, phenol or an aryl- or alkyl-substituted phenol such as o-, m- and p-cresol; m- and p-nonylphenol; 2-, 3- and 4-ethylphenol; 2-, 3- and 4-propylphenol; 2-, 3- and 4-isopropylphenol; 2-, 3- and 4-butylphenol; 2-, 3-and 4-tert-butylphenol; 2-, 3- and 4-phenylphenol; 2,4- and 2,6-diisopropylphenol; 2,4- and 2,6-diisobutylphenol; 2,4- and 2,6-di-tert-butylphenol; 2,6-di-tert-butyl-4-methyl-phenol; 2,4- and 2,6-diphenylphenol. The phenol can be a halophenol such as, for example, 2-, 3- and 4-fluorophenol; 2,3-, 2,4-, 2,5-, and 2,6-, 3,4- and 3,5-difluorophenol; 2,3,4-, 2,3,5-, 2,3,6-, 3,4,5-, 2,4,5- and 2,4,6-trifluorophenol; 2,3,4,5-, 2,4,5,6- and 2,3,5,6-tetrafluorophenol; pentafluorophenol; and the corresponding bromo- and chlorophenols. Alternatively, the phenol can be a haloalkyl-substituted phenol such as, for example, 3-trifluoromethylphenol, 2-trichloromethylphenol, 4-trifluoromethylphenol, 2-trifluoromethylphenol, 3-chlorodifluoromethylphenol, and 3-dichlorofluoromethylphenol. The phenol will generally be present in the metathesis catalyst in an amount of about 0.5 to about 4 moles per mole of the transition metal, preferably from about 1 to about 3 moles. Suitable alcohols include, for example, ethanol, isopropanol, t-butanol, octadecanol and the like. The alcohol will generally be present in the metathesis catalyst in an amount of about 0.5 to about 4 moles per mole of the transition metal, preferably from about 1 to about 3 moles. Mixtures of such alcohols and phenols can also be used.

The biphenol can be represented by the general formula

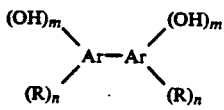

in which each Ar represents an aromatic ring-containing moiety having at least one hydroxyl group attached to an aromatic ring; each R is independently selected from $C_{1-12}$ alkyl, aryl, halide, mono-, di- or trihalomethyl, cyano and alkoxy; each n is independently 0–4; and each m is independently 1–4. Examples of suitable biphenols include 2,2'-biphenol, 4,4'-biphenol, 1,1'-bi-2-naphthol, tetra-tertiary-amyl-2,2'-biphenol, tetra-tertiary-amyl-4,4'-biphenol, tetra-tertiary-butyl-2,2'-biphenol, tetra-tertiary-butyl-4,4'-biphenol, 2,2'-dihydroxyfluorene, and 4,4'-dihydroxyfluorene. The biphenol will generally be present in the catalyst in an amount of about 0.1 to about 3 moles per mole of the transition metal, preferably from about 0.4 to about 1.5 moles, most preferably about 0.4 to about 1.0.

The reaction product of transition metal salt and organic ligand can be prepared, for example, by contacting, under an oxygen-free inert atmosphere, the alcohol, phenol or biphenol compound and the transition metal compound in an inert organic liquid with mild heat and removal of generated hydrogen halide. Suitable inert organic liquids for the reaction include, for example, cyclopentane, cyclohexane, benzene, toluene, xylene, chlorobenzene and dichlorobenzene. The inert organic liquid is then preferably distilled off under vacuum, and the residue is dissolved in dry, degassed cyclic olefin monomer or other suitable solvent such as toluene.

The Co-Catalyst

The present invention provides a co-catalyst which is used in combination with the transition metal halide metathesis catalyst for ring opening cycloolefin polymerization. The co-catalyst of this invention is a transition metal hydride of the formula $L_xMH$, where M is a Group IVB transition metal including zirconium, titanium and hafnium; L is a ligand selected independently from hydrogen, halides and organic ligands such as an optionally substituted $C_{1-20}$ alkyl or alkenyl, an optionally substituted $C_{3-20}$ cycloalkyl or cycloalkenyl having 3 to 6 carbon atoms in the cycloalkyl ring, an optionally substituted $C_5-C_{20}$ cycloalkadienyl having 5 carbons in the cycloalkadienyl ring, or an optionally substituted $C_{6-20}$ aryl or fused aryl group; and x is one less than the valence of M. The optional substitutions on the organic ligands include halogens, preferably chloride or fluoride, lower alkyl, alkoxy, or haloalkyl. Preferably at least one organic ligand is a cycloalkadienyl, e.g. cyclopentadienyl, pentamethylcyclopentadienyl, methylcyclopentadienyl, indenyl[benzocyclopentadienyl], or fluorenyl[dibenzocyclopentadienyl], or more preferably an optionally substituted cyclopentadienyl. The optional substituent on the cyclopentadienyl can be any inert substituent such as, for example, lower alkyls and aromatics.

M is preferably zirconium; L is preferably a cyclopentadienyl (Cp); and when L includes a halide, chloride is preferred. Thus, for example, zirconocene chloride hydride $Cp_2ZrClH$ co-catalyst in combination with bis(2,6-diisopropylphenoxy)tungsten oxydichloride catalyst is a particularly preferred catalyst system, in that it gives an exothermic polymerization reaction with dicyclopentadiene (DCPD).

Other examples of the metal hydride co-catalyst compounds include chlorobis(cyclopentadienyl)hydridozirconium [zirconocene hydride chloride], chlorobis(cyclopentadienyl)hydridotitanium [titanocene hydride chloride], chlorobis(cyclopentadienyl)hydridohafnium, bis(cyclopentadienyl)hydridomethylzirconium, bis(cyclopentadienyl)dihydridozirconium, cyclopentadienyldichlorohydridozirconium, bis(pentamethylcyclopentadienyl)chlorohydridotitanium, indenyldichlorohydridotitanium, cyclopentadienylindenylchlorohydridohafnium, and the like.

These co-catalysts are commonly prepared by reduction of the corresponding metal chloride with a reducing agent such as lithium aluminum hydride or other aluminum hydrides or borohydrides. The starting material cyclopentadienyl metal halides are typically prepared by reacting an alkali metal or alkaline earth metal salt of the cyclopentadienyl anion (e.g. sodium cyclopentadienide, cyclopentadienylmagnesium chloride, sodium indenide, sodium pentamethylcyclopentadienide, or dibenzocyclopentadienylmagnesium chloride) with a transition metal halide, typically the tetrachloride [King, *Organometallic Syntheses*, Vol 1: Transition-Metal Compounds, Academic Press, 1965 p. 64-81; Wailes and Weigold, *Inorganic Syntheses*, Vol 19, 223 (1979)].

Catalyst System

As used herein, the catalyst system composition comprises the transition metal halide catalyst and a co-catalyst, and optionally a moderator or a boron halide promoter. The co-catalyst will be present in the catalyst system composition in an amount effective to enhance the activity of the transition metal halide catalyst, which will vary depending upon the specific components present and the reaction conditions. In general, the co-catalyst will be present in a molar amount of from about 15:1 to about 1:1, preferably from about 8:1 to about 2:1, based on moles of transition metal catalyst.

The catalyst system may include a moderator to delay the initiation of polymerization if the selected catalyst and co-catalyst cause instant polymerization upon contact. Ethers, esters, ketones, nitriles and polar cyclic olefins are among suitable moderators for catalyst systems comprising tungsten catalyst. Ethyl benzoate, butyl ether bis(2-methoxyethyl)ether and polar cyclic olefins are preferred moderators.

Further, the catalyst system may optionally include a boron halide promoter, including boron trihalides, boron trihalide complexes and tetrahaloborates. The boron promoter can be, for example, such boron halides as boron tribromide, boron trifluoride, boron trifluoride diethyl ether complex, boron trifluoride dibutyl ether complex, boron trifluoride ethylamine, tetrafluoroboric acid diethyl ether, methyl boron difluoride, phenyl boron dichloride, triphenylmethyl fluoroborate, ammonium tetrafluoroborate, bis(2-ethyl-1-hexyl)ammonium tetrafluoroborate, boron trichloride dimethylsulfide, boron trifluoride alcohol complexes, and the like. The boron compound will be present in the polymerization reaction mixture in an amount effective to promote polymerization of the cyclic olefin monomer, generally from about 0.01 to about 10 moles, preferably from about 0.05 to about 2 moles, per mole of transition metal. The optimum level will vary depending upon the catalyst and co-catalyst, and amounts of boron halide above the optimum may inhibit polymerization. The presently-preferred boron halides, because of their high activity and stability, are boron trifluoride and its ethyl ether and butyl ether complexes.

Polymerization

The polymerization process of the invention involves contacting one or more cyclic olefin monomers with the catalyst system composition. Suitable cyclic olefin monomers and comonomers include polycyclicolefins containing a norbornene (bicyclo[2.1.0]heptene) group which can be represented by the structural formulas

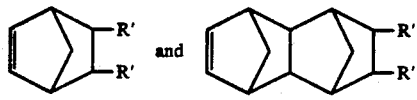

in which each R' is selected independently from hydrogen, $C_{1-20}$ alkyl, $C_{1-20}$ alkenyl, $C_{3-8}$ cycloalkyl, $C_{3-8}$ cycloalkenyl, $C_{6-20}$ aryl or fused aryl and, with R' groups linked together through carbon atoms, saturated and unsaturated cyclic hydrocarbon groups. Included in such monomers and comonomers are dicyclopentadiene, 5-(3-cyclohexen-1-yl)bicyclo[2.2.1]hept-2-ene, norbornene, norbornadiene, 5-(2-propenyl)norbornene and the like; and adducts of vinylcyclohydrocarbons, e.g. 4-vinylcyclohexene and cyclopentadiene or 3,5-divinylcyclopentene and cyclopentadiene and others as described in Kelsey, U.S. Pat. Nos. 5,095,082 and 5,143,992. Commercial cyclic olefins are available at various levels of purity, ranging from about 92 to about 99.9, the upper purity ranges being the result of distillation and further treatment for removal of contaminants and olefins which would be co-polymerized under polymerization conditions. As a general rule, transition metal catalysts employing an alkyl aluminum compound as co-catalyst require a high-purity monomer for acceptable polymerization activity, while the use of a tin hydride or borohydride co-catalyst permits the use of lower purity, technical-grade (83-95%) dicyclopentadiene monomer. An advantage of the invention catalyst system is that it is very active in relatively impure (90-95%) dicyclopentadiene.

The ring-opening polymerization of the invention is conducted by contacting the cycloolefin monomer and the catalyst system under polymerization conditions. It is, on some occasions, useful to provide an inert diluent in order to solubilize the catalyst system components. The catalyst system components will typically have the necessary solubility in the cycloolefin to be polymerized and in the preferred embodiment no added diluent is employed and the catalyst system components and the cycloolefinic monomer are contacted directly. Suitable polymerization conditions for such contacting include a polymerization temperature of from about 20° C. to about 250° C. with polymerization temperatures from about 30° C. to about 150° C. being preferred. The polymerization pressure is that pressure required to maintain the polymerization mixture in a non-gaseous state. Such pressures will vary with the reaction temperature but pressures up to about 5 atmospheres are satisfactory and frequently ambient pressure is suitable and is preferred.

The invention polymerization process is preferably carried out by reaction injection molding (RIM), in which a solution of the catalyst system, preferably in the monomer liquid to be polymerized, is injected into a mold simultaneously with the monomer, in liquid form, to be polymerized. The catalyst is generally employed in a molar ratio of RIM monomer to transition metal (mole:mole) of from about 200:1 to about 12,000:1, preferably about 500:1 to about 8000:1, most preferably about 1000:1 to about 5000:1.

In an illustrative polymerization, the monomer and catalyst system are mixed at a relatively low temperature at which rapid polymerization does not occur. The relatively low reaction rate permits efficient mixing or other processing of the polymerization mixture including the incorporation of fillers, reinforcements, anti-oxidants, stabilizers, pigments, elastomers or other materials provided to influence the properties of the polymerization product. A particularly contemplated embodiment of the process is in a reaction injection molding (RIM) process. Because of the relatively low initial rate of reaction, the monomer and catalyst system are mixed, typically by providing each component of the catalyst system with a portion of the cycloolefinic monomer, and the mixture is then transferred (injected) to a suitable mold including those molds for the production of large castings of complex shape. Notwithstanding the low initial reaction rate, the mixing and transfer must be accomplished rather quickly, for in a typical RIM process, the mixing/transfer time is on the order of a few seconds. Moreover, shortly after mixing of the monomer and catalyst system, a significant reaction exotherm occurs which substantially increases the temperature of the polymerizing mixture. While such an exotherm is at least in part beneficial in that the time for polymerization in the mold is reduced, it also requires that processing of the polymerization mixture be rapidly completed.

In an alternative RIM polymerization technique, a stream of the transition metal catalyst component in the monomer to be polymerized and a monomer stream containing any co-catalyst employed are combined in the mixing head of a RIM machine just prior to injection of the combined stream into a mold. The boron halide promoter, if used, is injected into the mixing head with the transition metal stream, with the co-catalyst stream, or in a separate monomer solution stream.

The initial mold temperature will generally be within the range of about 20° to about 200° C., preferably about 30° to about 150° C. The mold pressure is generally within the range of about 10 to about 50 psi. After injection of the catalyst and monomer into the mold, there is typically an interval of time, called the "induction time," before onset of a rapid exotherm from the exothermic polymerization reaction. In a commercial RIM process, this induction time should be sufficiently long to permit filling of the mold, typically about 2 minutes, preferably less than thirty seconds. Once the polymerization reaction is initiated, polymerization should occur quite rapidly, usually within about 10 seconds to about 1 minute, and is accompanied by a rapid rise in temperature.

Various optional components can be present in the reaction mixture during polymerization, including solvents, fillers, anti-oxidants, flame retardants, blowing agents, stabilizers, foaming agents, pigments, plasticizers, reinforcing agents and impact modifiers. Particularly preferred is the addition of from about 1 to about 10 weight percent, based on the weight of the monomer, of an elastomer for impact modification of the polymer. These components are most conveniently added to the reaction as constituents of one or more of the reaction mixture streams, as liquids or as solutions in the monomer.

After the polymerization reaction is complete, the molded object may be subjected to an optional post-cure treatment at a temperature in the range of about 100° to about 300° C. for about 1 to 24, preferably about 1 to 2 hours. Such a post-cure treatment can enhance certain polymer properties, including glass transition temperature.

The polymerized products of this invention are soluble linear themoplastics or hard, insoluble, crosslinked thermoset polymers useful for making auto parts, and housings for machines or electronic instruments.

The invention is further described by the following examples which should not be regarded as limiting.

EXAMPLE I

Zirconocene Chloride Hydride Co-catalyst

A 30 mL serum bottle with a teflon-coated stir bar was charged under nitrogen atmosphere with 61 mg (0.236 mmol) zirconocene chloride hydride (Aldrich) and 15.5 g dry, degassed dicyclopentadiene (DCPD), sealed with a serum cap, and the mixture stirred for about 4 hours, after which time the solution had become yellow and most of the hydride had dissolved. To the stirred solution was added via syringe 0.525 g (0.059 mmol) of a 7% solution of bis(2,6-diisopropylphenoxy)-tungsten oxydichloride ("tungsten catalyst") in dry DCPD. After stirring for about 30 seconds at room temperature, the vial, containing a thermocouple, was transferred to an oil bath at 90° C. After about 5.9 minutes, at which time the reaction mass had gelled and the internal temperature of the reaction mass had reached about 108° C., a rapid polymerization ensued causing a rapid temperature rise which reached 195° C. within about 1.3 minutes later. The product was a hard polymer.

While particular catalyst system compositions of this invention have been disclosed, it will become apparent to those of skill in this art that various changes may be made in the compositions and methods disclosed without departing from the scope of the invention, which is defined by the following claims.

What is claimed is:

1. A cyclic olefin metathesis polymerization catalyst system comprising:
   a transition metal halide metathesis catalyst; and
   an organo transition metal hydride co-catalyst of the formula

$$L_x\text{—M—H}$$

wherein M is zirconium, titanium or hafnium;
   L is independently hydrogen, halide or an organic ligand selected from the group consisting of an optionally substituted $C_{1-20}$ alkyl or alkenyl, optionally substituted $C_{3-20}$ cycloalkyl or cycloalkenyl having 3 to 6 carbon atoms in the ring, an optionally substituted $C_{5-20}$ cycloalkadienyl having 5 carbon atoms in the cycloalkadienyl ring, an optionally substituted $C_{6-20}$ aryl or fused aryl, and at least one L is a cycloalkadienyl and wherein the optional substituents are selected from the group consisting of halogen, $C_{1-6}$ alkyl, $C_{1-6}$ alkoxy, and $C_{1-6}$ haloalkyl; and
   x is one less than the valence of M.

2. The catalyst system of claim 1 wherein M of the co-catalyst is zirconium.

3. The catalyst system of claim 1 wherein at least one L of the co-catalyst is an optionally substituted cyclopentadienyl.

4. The catalyst system of claim 1 wherein the co-catalyst is bis(cyclopentadienyl)hydridomethylzirconium, bis(cyclopentadienyl)dihydridozirconium, cyclopentadienyldichlorohydridozirconium.

5. The catalyst system of claim 1 wherein the co-catalyst is zirconocene chloride hydride.

6. The catalyst system of claim 1 wherein the co-catalyst is bis(pentamethylcyclopentadienyl)chlorohydridotitanium, indenyldichlorohydridotitanium, or chlorobis(cyclopentadienyl)hydridotitanium.

7. The catalyst system of claim 1 wherein the co-catalyst is cyclopentadienylindenylchlorohydridohafnium or chlorobis(cyclopentadienyl)hydridohafnium.

8. The catalyst system of claim 1 wherein the metathesis catalyst is a phenolic substituted tungsten or molybdenum halide.

9. The catalyst system of claim 8 wherein the metathesis catalyst is bis(2,6-diisopropylphenoxy) tungsten oxydichloride.

10. In a process of polymerizing cycloolefins by contacting the cycloolefin under polymerizing conditions with an olefin metathesis catalyst system comprising a transition metal halide metathesis catalyst and a co-catalyst, the improvement which comprises:
employing an organo transition metal hydride co-catalyst of the formula $$L_x\!-\!M\!-\!H$$

wherein M is zirconium, titanium or hafnium;
L is independently hydrogen, halide or an organic ligand selected from the group consisting of an optionally substituted $C_{1\text{-}20}$ alkyl or alkenyl, optionally substituted $C_{3\text{-}20}$ cycloalkyl or cycloalkenyl having 3 to 6 carbon atoms in the ring, an optionally substituted $C_{5\text{-}20}$ cycloalkadienyl having 5 carbon atoms in the cycloalkadienyl ring, an optionally substituted $C_{6\text{-}20}$ aryl or fused aryl, and at least one L is a cycloalkadienyl and wherein the optional substituents are selected from the group consisting of halogen, $C_{1\text{-}6}$ alkyl, $C_{1\text{-}6}$ alkoxy, and $C_{1\text{-}6}$ haloalkyl; and
x is one less than the valence of M.

11. The process of claim 10 wherein the co-catalyst is bis(cyclopentadienyl)hydridomethylzirconium, bis(cyclopentadienyl)dihydridozirconium, cyclopentadienyldichlorohydridozirconium.

12. The process of claim 10 wherein the co-catalyst is bis(pentamethylcyclopentadienyl)chlorohydridotitanium, indenyldichlorohydridotitanium, or chlorobis(cyclopentadienyl)hydridotitanium.

13. The process of claim 10 wherein the co-catalyst is cyclopentadienylindenylchlorohydridohafnium or chlorobis(cyclopentadienyl)hydridohafnium.

14. The process of claim 10 wherein the co-catalyst is zirconocene chloride hydride.

15. A polymerizable mixture comprising:
a cycloolefin containing at least one norbornene group;
a transition metal halide metathesis catalyst; and
an organo transition metal hydride co-catalyst of the formula $$L_x\!-\!M\!-\!H$$

wherein M is zirconium, titanium or an hafnium;
L is independently hydrogen, halide or organic ligand selected from the group consisting of an optionally substituted $C_{1\text{-}20}$ alkyl or alkenyl, optionally substituted $C_{3\text{-}20}$ cycloalkyl or cycloalkenyl having 3 to 6 carbon atoms in the ring, an optionally substituted $C_{5\text{-}20}$ cycloakadienyl having 5 carbon atoms in the cycloalkadienyl ring, an optionally substituted $C_{6\text{-}20}$ aryl or fused aryl, and at least one L is a cycloalkadienyl and wherein the optional substituents are selected from the group consisting of halogen, $C_{1\text{-}6}$ alkyl, $C_{1\text{-}6}$ alkoxy, and $C_{1\text{-}6}$ haloalkyl; and
x is one less than the valence of M.

16. The polymerizable mixture of claim 15 wherein the cycloolefin is dicyclopentadiene.

17. The polymerizable mixture of claim 15 wherein the transition metal halide metathesis catalyst is a phenolic substituted molybdenum or tungsten halide.

18. The polymerizable mixture of claim 15 wherein the co-catalyst is zirconocene chloride hydride.

19. The polymerizable mixture of claim 15 wherein the co-catalyst is bis(cyclopentadienyl)hydridomethylzirconium, bis(cyclopentadienyl)dihydridozirconium, cyclopentadienyldichlorohydridozirconium.

20. The polymerizable mixture of claim 15 wherein the co-catalyst is bis(pentamethylcyclopentadienyl)-chlorohydridotitanium, indenyldichlorohydridotitanium, or chlorobis(cyclopentadienyl)hydridotitanium.

21. The polymerizable mixture of claim 15 wherein the co-catalyst is cyclopentadienylindenylchlorohydridohafnium or chlorobis(cyclopentadienyl)hydridohafnium.

* * * * *